United States Patent Office 3,498,944
Patented Mar. 3, 1970

3,498,944
SOLVENTS FOR SPINNING SOLUTION OF POLYESTER URETHANES
Michael Dunay, Fanwood, and Basil S. Sprague, Berkeley Heights, N.J., assignors to Celanese Corporation, a corporation of Delaware
No Drawing. Filed Sept. 25, 1964, Ser. No. 399,361
Int. Cl. C08g 51/34
U.S. Cl. 260—33.4                                2 Claims

ABSTRACT OF THE DISCLOSURE

A spinning composition and method for forming said composition which is particularly useful in dry spinning of substantially linear, segmented, elastomeric copolymers. The segmented copolymer used comprises a soft, low-melting polymer, chemically linked to a hard, high-melting polymer. The copolymer is dissolved in a halogenated, lower hydrocarbon or a mixture of a major proportion of a halogenated, lower hydrocarbon and a minor proportion of a lower, aliphatic alcohol to produce the spinning composition. The addition of the lower, aliphatic alcohol results in an increase in the proportion of copolymer which can be dissolved in the solvent mixture.

---

Our invention relates to solutions of polymer forming materials and more particularly relates to spinning solutions for use in forming fibers of segmented elastomeric copolymers.

In recent years a great amount of interest has been demonstrated in a class of synthetic elastomers developed from copolymer formulations which can be broadly described as substantially linear, segmented, elastomeric copolymers. These copolymers have been used to prepare fibers which, in comparison to natural rubber and many synthetic rubbers, have excellent elastic properties, toughness, abrasion resistance and improved heat stability, oxidative stability and stability on exposure to ultraviolet light.

While the fiber forming spinning techniques well known in the art and employed in the production of other types of fibers can be employed to form fibers from these segmented elastomers, it has previously been necessary to use comparatively expensive solvents such as tetrahydrofuran and dimethylformamide to obtain the requisite spinning solution.

We have discovered a means of providing a spinning solution employing efficacious solvents which are economically feasible and which can readily be recovered by the use of solvent recovery systems commonly used in the art.

The composition of our invention comprises a solution of an essentially linear, segmented, elastomeric copolymer in a solvent selected from the group consisting of lower halogenated hydrocarbons and mixtures of lower halogenated hydrocarbons and lower aliphatic alcohols.

The term "segmented elastomeric copolymers" as used throughout this specification and in the claims is meant to describe elastomeric copolymers comprised of two principle types of segments which are chemically connected and alternate in the chemical chain. One segment, preferably essentially amorphous, is derived from low melting soft polymers such as, for example, an ester polymer, an ether polymer, a hydrocarbon polymer, and the like. These soft polymers are characterized by weak interchain attractive forces. The other segment is derived from a hard, high melting polymer such as, for example, a urethane polymer.

In particular, the amorphous segments of these elastomers are derived from low melting polymers having a melting point below about 60° C., having a molecular weight of from about 250 to about 5000 and containing terminal radicals possessing active hydrogen atoms. The hard, high melting segments are derived from linear hard polymers having a melting point above about 150° preferably above 200° C. in their fiber forming molecular weight range, i.e., above about 5000. The soft segments, as present in the elastomer, may appear as radicals of the initial polymer from which the terminal active hydrogens have been removed. Generally, the hard segments comprise from about 10% to about 40% by weight of the segmented copolymer and may be defined as comprising at least one repeating unit of the linear hard polymer from which they are derived. The preparation of these segmented elastomeric copolymers is well known in the art and is particularly described in U.S. Patent No. 2,871,218.

Illustrative of the types of elastomer copolymers suitable for employment in formulating the spinning solution of our invention are the polyester-urethane copolymers described in U.S. Patent 2,871,218 wherein a critical ratio of as essentially linear hydroxyl terminated polyester prepared from a saturated aliphatic glycol having terminal hydroxyl groups and a dicarboxylic acid or its anhydride, and a diphenyl diisocyanate are reacted in the presence of a saturated aliphatic free glycol having terminal hydroxyl groups so that no unreacted isocyanate and hydroxyl groups remain. Broadly, such a copolymer is obtained by reacting one mole of polyester with from 1.1 to 3.1 moles of a diphenyl diisocyanate in the presence of from about 0.1 to 2.1 moles of free glycol.

Generally, the synthetic elastomers referred to in this invention are copolymer formulations based on low molecular weight aliphatic polyesters or polyethers having terminal hydroxyl and/or carboxyl groups which are capable of further reaction with diisocyanates. This latter reaction can be used to couple the lower molecular weight polyester or polyether via urethane links or the diisocyanate can be used in excess so that it becomes a terminal group. In this latter case, the macro-diisocyanates formed can be coupled by means of other reagents such as water, diols, amino alcohols and diamines with the subsequent formation of the high polymer. It should be noted that, in order to obtain the desired degree of extensibility and elasticity in the elastomer, it may be necessary to employ, in the place of a long chain soft segment, as segment comprised of several smaller units. Thus, for example, it is sometimes necessary to join several short chain glycol: diisocyanate units and employ the combination in connection with the hard segments, rather than make use of a single long chain glycol.

The polyester preferred for use in preparing the segmented copolymers to be used in accordance of our invention are essentially linear hydroxyl terminated polyesters having a molecular weight between 600 and 1200 and an acid number less than 10. The basic polyesters utilized include polyesters prepared from the esterification of such dicarboxylic acids as adipic, succinic, pimelic, suberic, azelaic, sebacic and the like or their anhydride. Preferred acids are those dicarboxylic acids of the formula HOOC—R—COOH, where R is an alkylene radical containing from 2 to 8 carbon atoms. The glycols utilized in preparing the polyester are preferably straight chain glycols containing between 4 and 10 carbon atoms, such as butanediol-1,4, hexamethylenediol-1,6, octamethylenediol-1,8 and the like. In general the glycol is preferably of the formula $HO(CH_2)_xOH$ wherein $x$ is 4 to 10.

A variety of organic diisocyanates may be used to prepare the elastomeric copolymers suitable for employment in our invention. Illustrative examples of these diisocyanates are: cyclopentylene-1, 3-diisocyanate, 1,4-diisocyanate cyclohexane, p-phenylene diisocyanate, m-phenylene diisocyanate, the tolylene diisocyanates, the naphthalene diisocyanates, 4,4'-diphenyl propane diisocyanate, 4,4'-diphenylmethane diisocyanate, dichlorodiphenyl methane diisocyanate, dimethyl diphenyl methane diisocyanate, dibenzyl diisocyanate, diphenyl ether diisocyanate, and the like. It is preferred to use diphenyl methane diisocyanates, particularly 4,4'-diphenylmethane diisocyanate.

The solvents employed in our invention can be either a lower halogenated hydrocarbon alone or in admixture with a lower aliphatic alcohol. Suitable halogenated hydrocarbons include, for example, alkylene halides, and preferably the lower alkylene halides such as, for example, methylene chloride, ethylene chloride, or propylene chloride. Among the aliphatic alcohols suitable for use in our invention are methanol, ethanol, and isopropanol. When employing a chlorinated hydrocarbon-alcohol solvent mixture in our invention, the hydrocarbon should constitute at least about 60% by weight of the solvent and preferably comprises from about 70 to about 95% by weight of the solvent while the aliphatic alcohol comprises from about 5 to 30% by weight.

In preparing the spinning solutions of our invention, the temperatures employed will vary with the particular solvent or solvent blend being used. Usually, it is desirable to maintain the solvent mixture at a temperature of from about 50° C. to about 110° C. Preferably, any elevated temperatures employed should be in the range from about 60° to 90° C. When employing low boiling constituents in our solvent mixture, it may become necessary to effect the dissolution under a sufficiently elevated pressure (usually up to 2 atmospheres) in order to maintain the solution in the liquid phase.

As can readily be appreciated, the amount of elastomeric copolymer which will dissolve in the system of this invention will depend on a number of variables, including temperature and ratio of solvent components. All other factors remaining constant, from about 1% to about 30%, by weight, of copolymer based on the total solution, will dissolve in a solution containing a molar ratio of alcohol-alkylene halide ranging from about 0:1 to about 1.1:0.7.

In summary, then, it can be seen that the solvent systems of this invention enable economic and efficient spinning of fibers which exhibit excellent properties of extensibility and elasticity. Moreover, the solutions of the elastomeric copolymers can also be utilized to cast fibers and prepare other shaped articles.

In order to illustrate our invention further, reference is made to the following examples.

EXAMPLE I

A polyesterurethane copolymer of the type described in U.S. Patent 2,871,218 and obtained by reacting hydroxyl poly (tetramethylene adipate) (molecular weight= 850; hydroxyl number=130.4; acid number=0.89), butanediol-1, 4 and diphenyl methane-p,p'-diisocyanate in a molar ratio of 1.0:0.3:1.3, respectively, was employed in this example.

Samples of this elastomer were separated and each sample was combined with solvent mixtures of varying proportions. The quantity of each sample was calculated to provide a solution containing 20% by weight solids based on the weight of the total solution. The materials employed in these solutions were methylene chloride and methanol having the physical properties set forth in Table I.

TABLE I

|  | Methylene Chloride | Methanol |
| --- | --- | --- |
| Formula weight | 84.94 | 32.04 |
| Specific gravity | 1.336,$^{20°}$ | 0.792,$^{20°}$ |
| Melting point, °C | −96.7 | −97.8 |
| Boiling point, °C | 40.2 | 64.7 |

Each test was carried out in a closed pressure vessel at temperatures between 80° C. and 90° C., unless otherwise indicated. The results of these tests are shown in Table II. In each instance recorded below, the proportions of solvent mixtures are expressed in percent by weight based on the total solvent.

TABLE II

| Methylene Chloride | | Methanol | | Solubility | Remarks |
| --- | --- | --- | --- | --- | --- |
| Percent (Wt.) | Percent (Vol.) | Percent (Wt.) | Percent (Vol.) | | |
| 100 | 100 | 0 | 0 | Swells | Soluble 100° C., gels on cooling. |
| 97 | 95 | 3 | 5 | ....do...... | Do. |
| 94 | 90 | 6 | 10 | Sol. hot, insol. room temp. | Soluble 100° C., borderline 90° C., gels on cooling. |
| 87 | 80 | 13 | 20 | ....do...... | Soluble, gels on cooling. |
| 80 | 70 | 20 | 30 | ....do...... | Do. |
| 71 | 60 | 29 | 40 | ....do...... | Do. |
| 63 | 50 | 37 | 50 | ....do...... | Soluble, partial gelling, partial precipitation. |

From the above data it is evident that the elastomeric copolymer is soluble in methylene chloride at elevated temperatures; however, at a temperature in the range of 80 to 90° C. the copolymer tended to absorb all of the solvent. The quantity of solvent present to give a 20% solids concentration was insufficient to complete the dissolution of the copolymer. The 20% solids solution did become fluid at 100° C. but some discoloration was observed. The addition of methanol permitted a more concentrated copolymer solution to be obtained.

The 50-50 mixture by volume of methylene chloride and methanol was effective in forming a solution of the copolymer. In all tests in which the solvent contained more than 50% by volume of methylene chloride, gellation occurred on cooling to room temperature. In the 50-50 sample a considerable amount of precipitation occurred on cooling. Thus, the most effective range appears to be a methylene chloride to methanol mixture ranging from about 60/40 by volume up to a little above 90/10 by volume.

EXAMPLE II

A quantity of the same elastomeric copolymer as employed in Example I was prepared as a spinning solution. Titanium dioxide pigment was incorporated into the copolymer by dry milling. The quantity of titanium dioxide employed was equal to 5% by weight of the total elastomer employed. This solid mixture of titanium dioxide and elastomer was then dissolved in a solvent mixture comprising 91% by volume methylene chloride and 9% by volume methanol to provide a spinning solution containing 25% by weight total solids. The spinning solution was maintained at a temperature of 60° C. and a pressure of about 30 p.s.i.g. throughout the spinning operation. The spinning solution was metered by pumps through heated candle filters and heaters to the spinnerettes. Filaments were extruded downward into a hot downdraft cabinet having a bottom wall temperature of 150° C. Vaporized solvents were withdrawn to a carbon absorber.

Samples of filaments obtained from the spinning operation were subjected to a 30 minute boil-off and then tested for physical properties. The results are set forth in Table III.

TABLE III

| | |
| --- | --- |
| Tenacity (gms./denier) | 0.75 |
| Elongation, percent | 400 |
| Stress at 300% strain (gms./denier) | 0.38 |
| Permanent set, percent | 14 |
| Boil-off shrinkage | 16 |

Thus, it can be seen that our invention provides solutions of segmented, elastomeric copolymer suitable for use in fiber forming operation.

We claim:

1. The method of forming a spinning composition for use in dry spinning an elastomeric copolymer which comprises dissolving from about 1 to about 30%, by weight, based on the total solution of a linear, segmented, elastomeric copolymer in a solvent comprising a mixture comprising a major portion of methylene chloride and a minor portion of methanol at a temperature from about 50° C. to about 110° C. and at a pressure sufficient to maintain the solution in the liquid phase at such temperatures wherein the segmented, elastomeric copolymer is obtained by heating a mixture comprising (1) one mole of an essentially linear hydroxyl terminated polyester of a saturated aliphatic glycol having from 4 to 10 carbon atoms and having hydroxyl groups on its terminal carbon atoms and a material selected from the group consisting of a dicarboxylic acid of the formula HOOC—R—COOH where R is an alkylene radical containing from 2 to 8 carbon atoms and its anhydride, said polyester having an average molecular weight between 600 and 1200 and having an acid number less than 10, and (2) from about 1.1 to 3.1 moles of a diphenyl diisocyanate in the presence of (3) from about 0.1 to 2.1 moles of a glycol of the formula $HO(CH_2)_xOH$ wherein $x$ is a number from 4 to 10.

2. The method of claim 1 wherein the solvent comprises by weight about 70 to 95 percent methylene chloride and about 5 to 30 percent methanol.

References Cited

UNITED STATES PATENTS

| | | |
|---|---|---|
| 2,871,218 | 1/1959 | Schollenberger. |
| 2,962,470 | 11/1960 | Jung. |
| 3,036,979 | 5/1962 | Wittbecker. |
| 3,047,356 | 7/1962 | Polansky. |
| 2,929,804 | 3/1960 | Steuber _____ 264—205 |
| 3,111,368 | 11/1963 | Romano _____ 264—205 |

OTHER REFERENCES

Saunders et al.: Polyurethanes: Chemistry and Technology, Part II, Interscience Publishers, 1964; pp. 694, 697–700, 732.

MORRIS LIEBMAN, Primary Examiner

L. T. JACOBS, Assistant Examiner

U.S. Cl. X.R.

260—33.8